July 9, 1935. F. W. OPP 2,007,383
APPARATUS FOR AND METHOD OF ELECTRICALLY TREATING SOIL
Filed Sept. 8, 1934 2 Sheets-Sheet 1
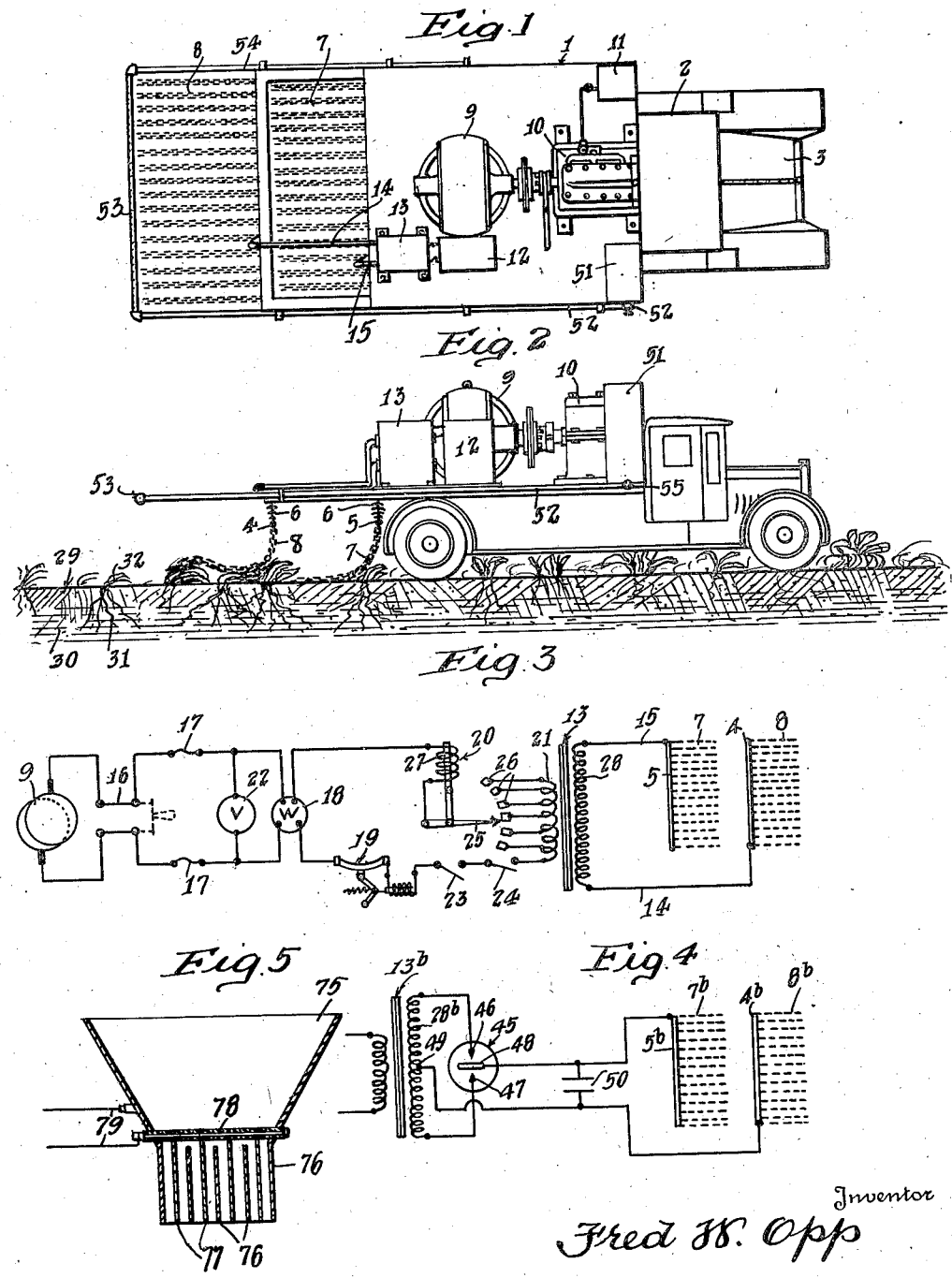

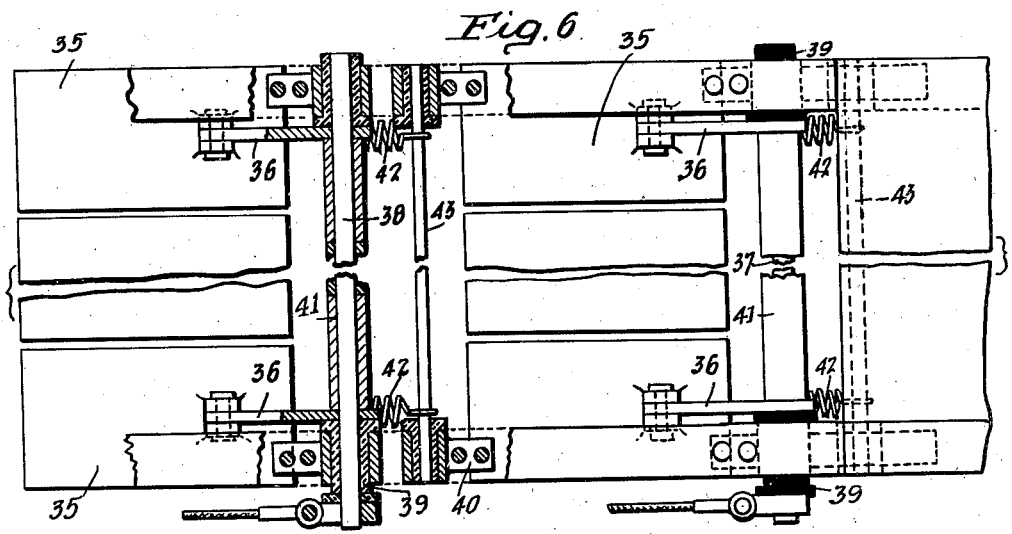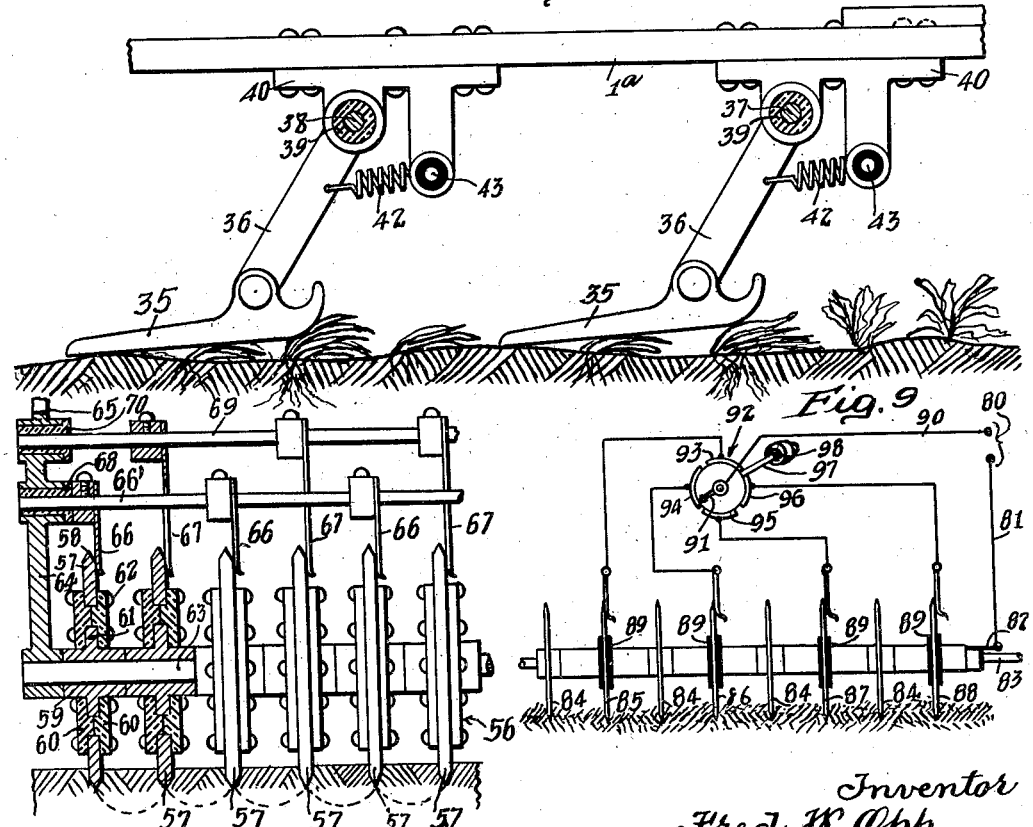

Patented July 9, 1935

2,007,383

UNITED STATES PATENT OFFICE 2,007,383

APPARATUS FOR AND METHOD OF ELECTRICALLY TREATING SOIL

Fred W. Opp, Costa Mesa, Calif., assignor of one-half to Walter C. Collins

Application September 8, 1934, Serial No. 743,193

20 Claims. (Cl. 47—1)

This invention relates broadly to methods of and apparatus for killing weeds and destroying bacteria, fungi, and other forms of animal and plant life in soil.

A broad object of the invention is to provide an effective and relatively inexpensive method of killing weeds, particularly weeds of a type that are not readily destroyed by surface cultivation of the soil.

Another object is to provide a practicable method of sterilizing soil in place in the field.

Another object is to provide a method of treating soil in the field to increase its fertility.

A more specific object is to provide a portable apparatus adapted to be moved over a field for applying a killing electric current to the weeds growing in the field and to the soil of the field, whereby bacteria, fungi, and other forms of animal and plant life within the soil itself, will be killed, and nitrogen in the air in the soil will be fixed and made available as fertilizer, and ozone released to oxidize organic matter and thereby make available additional plant food.

Other objects and features of the invention will become apparent from the following detailed description of several modifications of the invention, which description refers to the drawings.

In the drawings:

Fig. 1 is a diagrammatic representation in plan of a truck equipped for weed destruction in accordance with the invention;

Fig. 2 is an elevation view of the apparatus shown in Fig. 1;

Fig. 3 is a schematic wiring diagram showing an electrical circuit that may be employed with the equipment shown in Figs. 1 and 2;

Fig. 4 is a schematic diagram showing a modification of the circuit shown in Fig. 3;

Fig. 5 is a sectional elevation view of a device for electrically treating loose soil in accordance with the invention;

Fig. 6 is a plan view of an alternative electrode structure to be employed with a truck of the type disclosed in Figs. 1 and 2;

Fig. 7 is an elevation view of the electrode structure shown in plan in Fig. 6;

Fig. 8 is a detailed vertical sectional view of still another modification of electrode structure adapted for use with a truck of the type disclosed in Figs. 1 and 2; and Fig. 9 is a schematic diagram illustrating a modification of the electrode structure shown in Fig. 8, in which modification the current is applied successively to different electrodes.

I have shown in Figs. 1 and 2 a specially equipped truck adapted to be driven over an area of land infested with weeds for destroying the latter. The truck proper may be of conventional form consisting of a chassis having a floor 1 and a driver's cab 2 mounted thereon. The truck is preferably driven by a gasoline motor mounted under a hood 3 in accordance with conventional trucks.

The floor 1 preferably projects a substantial distance rearwardly of the rear wheels of the truck and has suspended therefrom a pair of cross bars 4 and 5, respectively, these bars extending transversely with respect to the truck, and the bar 4 being mounted a substantial distance rearwardly of the bar 5. Each bar 5 and 4 is insulatingly suspended below the floor 1 by electrical insulators 6 adapted to withstand relatively high potentials. The bar 5 has suspended therefrom a plurality of chains 7, and the bar 4 has suspended therefrom a plurality of chains 8. Both the chains 7 and the chains 8 are of sufficient length compared to the height of the bars 4 and 5 above the ground surface to drag along the ground for a substantial distance when the truck is in motion. However, the length of the chains 7 is not so great as to permit the rear ends of these chains coming in contact with the chains 8.

The chains 7 and 8 are adapted to be oppositely electrified by connecting a suitable source of potential across the bars 4 and 5, respectively. To this end, I mount upon the floor 1 of the truck a generator 9 and an internal combustion engine 10 for driving the generator. As shown in Figs. 1 and 2, the generator and motor are connected directly together although this is not essential. A fuel tank 11 is provided for supplying fuel to the engine 10. The generator 9 is preferably an alternator and its output is connected through suitable control devices housed in a case 12 to a transformer 13 which steps up the potential generated by the alternator and applies it through heavily insulated leads 14 and 15, respectively, to the bars 4 and 5.

Referring now to Fig. 3, which shows in greater detail the elements of the electrical circuit, it will be observed that the terminals of the alternator 9 are connected through a switch 16, fuses 17, a watt meter 18, a circuit breaker 19, and a current regulating device 20, to the primary winding 21 of transformer 13. A voltmeter 22 is also bridged across the line ahead of the watt meter 18. The switch 16, fuses 17, voltmeter 22, watt meter 18, circuit breaker 19 and current regulator 20 are contained within the control box 12, shown in Figs. 1 and 2. Auxiliary safety switches 23 and 24 are also preferably provided in series with the circuit to prevent any possibility of high potential being applied to the electrode chains 7 and 8 except when the truck driver is in position in the driver's seat of the truck and the cab doors are closed. Thus switch 23 may be constituted by a switch mounted below the cushion of the driver's seat and adapted to be closed only by the weight of the driver. Switch 24 may be actuated by the door of the driver's cab so that the switch is closed only when the door is closed. These safety switches 23 and 24 are quite important because the potential applied to the exposed electrodes 7 and 8, which drag along the ground when the truck is in use, would be very dangerous to human life.

The current regulator 20 may be of various well known forms but is shown in Fig. 3 as comprising a contact member 25 adapted to be swung over a series of contacts 26 connected to taps on the primary winding 21 of transformer 13. The movable member 25 is shown actuated by a solenoid 27 connected in series with the circuit. Any increase in the current flow tends to shift the contact member 25 upwardly over the contacts 26, thereby increasing the number of turns in the primary winding 21 and thereby reducing the potential induced in the secondary winding 28 of the transformer.

The circuit breaker 19 is provided to prevent damage to the equipment in case the electrodes 7 and 8 should be short circuited for any reason, such as by running over a metallic object on the ground.

Although not specifically shown in the schematic diagrams of Figs. 1 and 2, the engine 10 driving the generator 9 is preferably provided with a governor to maintain its speed substantially constant under variations between no load and full load conditions. Such devices are old in the art and do not constitute invention at this time.

The operation of the device may be readily understood from examination of Fig. 2 of the drawings, in which the soil of the field over which the device is run is shown in section. For most effective results, the apparatus is employed following a period of dry weather when the surface of the ground is relatively dry as compared with the soil at a greater depth. Thus in Fig. 2 the top soil 29 is relatively dry whereas the soil 30 at greater depths will contain a substantially larger moisture content. The root systems 31 of weeds 32 to be killed are shown as penetrating down through the dry top soil 29 into the wetter sub soil 30.

As the device is driven over the field, electrode chains 7 and 8 drag along the surface of the ground and a certain amount of current flows through the soil between the electrodes, depending upon the amount of moisture in the top soil. However, if the device is operated following a period of dry weather the amount of current flowing through the top soil is relatively small. All plants in the green or growing stage, however, contain a relatively large moisture content and are therefore good conductors of electricity as compared with dry soil. Therefore, as the electrode chains 7 and 8 drag over the tops of the weeds, a path of relatively low resistance between the two sets of chains is provided between the top and root systems of the plants and the relatively moist sub soil, and relatively heavy currents will be produced in the roots, particularly the main or trunk portions of the roots, of the weeds. I have found that this current can be easily made sufficiently intense to kill the weeds. In some instances the current may be so intense as to kill the weeds by heating them sufficiently to convert the moisture therein to steam but in general such intense heating is not required to cause the death of the plant. I have found that currents so low as to produce no perceptible heating effect causes the plants to eventually wither and die. It seems likely that in such instances the eventual death of the plants results from electrolysis of the plant solutions with the production of chemicals that are toxic to the plant.

The method described is particularly satisfactory for killing certain weeds, such as wild morning glory, which have very deep and enduring root systems and are not permanently killed by surface cultivation, the roots sending up new shoots if the tops are merely cut off. My electrical treatment kills the roots, or at least so large a portion of them that the plant does not recover.

Although as shown in Fig. 1 the two sets of electrodes are arranged in tandem fashion so that they successively drag over the same path, this arrangement is not essential and if desired one set of electrodes may be laterally displaced with respect to the other so that the machine covers a wider swath during each trip across the field.

Furthermore, various modifications may be made in the electrode structure. For instance, instead of chains, shoes may be employed. Thus referring to Figs. 6 and 7, it will be observed that shoes 35, adapted to slide along the ground, are pivotally attached to the lower ends of links 36 which in turn are pivotally attached at their upper ends to insulatingly supported cross bars 37 and 38 to which connection is made from the transformer in the same fashion as connection was made to the bars 4 and 5 in the embodiment shown in Figs. 1 and 2. Each of the cross bars 37 and 38 may comprise a shaft insulatingly supported adjacent the ends in bushings 39 of insulating material, which are in turn mounted in brackets 40 which are secured to the floor 1a of the truck.

The links 36 have eyes at their upper ends which fit upon the shaft 37 or 38 and adjacent links 36 may be maintained in spaced relation by sleeves 41 which are slidable on the shafts. To aid in maintaining the shoes 35 in firm contact with the ground, a spiral spring 42 may be connected between each link and an insulatingly supported shaft 43 positioned in front of and slightly below the shafts 37 and 38, respectively. These shafts 43 may be insulatingly supported in substantially the same manner as the shafts 37 and 38. The width of the shoes 35 is preferably so chosen with respect to the spacing between the shoes that only sufficient space is left between the shoes to permit free relative movement when moving over uneven ground.

Although I have found alternating current to be satisfactory, there may be occasions where direct current will produce better results. In this event, the modification of the circuit shown in Fig. 4 may be employed. In this circuit, corresponding parts of which bear the same reference numerals as the circuits of Fig. 3 with the suffix "b" added thereto, the apparatus up to the transformer 13b is identical with the circuits shown in Fig. 3. However, instead of connecting the secondary winding 28b directly to the electrodes, they are connected thereto through a rectifier. Thus a rectifier is indicated at 45, having a pair of anodes 46 and 47, respectively, connected to the opposite ends of the secondary winding 28b and having a cathode 46 connected to the electrode bar 5b. The other electrode bar 4b is connected to a mid tap 49 on the winding 28b. A condenser 50 of relatively large capacity is preferably bridged across the electrodes 4b and 5b to reduce the pulsations in the current and to store energy so that whenever one of the electrode elements 7b or 8b touches a new plant a sudden intense surge of current is produced in the plant. In this way momentary currents may be produced in the plants, which currents are of greater intensity than would otherwise be obtained and have a more destructive effect on the cell structure of the plant.

In some instances where the electrical treatment alone is found ineffective to totally destroy the plant life, better effects may be obtained by spraying the plants with a toxic solution following their electrical treatment. The results obtained are more effective than spraying the plants without first discharging electricity through them for the reason that the high potential current tends to disrupt the cellular structure of the plants, in many instances splitting the stems or roots and thereby increasing the effectiveness of the toxic spray solution. There is shown in Figs. 1 and 2 apparatus for spraying the plants following their electrical treatment, this apparatus comprising a tank 51 mounted on the floor of the truck for containing a spray solution, which tank is connected by a pipe 52 extending along the edge of the floor 1 to a point beyond the rear end of the floor, where it connects onto a spray pipe 53 having apertures therein for discharging the solution rearwardly of the rear electrode chains 8. The end of the spray pipe 53 opposite to that end connected to the pipe 52 may be supported by a pipe 54 extending back along the other edge of the floor 1 and secured thereto, the end of this pipe being closed with a plug. The discharge of the spray from the tank 51 through the pipe 52 may be controlled by a valve 55.

The apparatus so far described is particularly useful for weed destruction. However, it will act as a soil sterilizer to a certain extent, being most effective when the surface soil is relatively damp (the condition, which as aforesaid, was least conducive to effective weed destruction), a substantial current then flowing through the surface soil between the electrodes. However, where soil sterilization is the chief object sought, more effective results can be obtained with an electrode structure of the type disclosed in Fig. 8, this structure consisting of a plurality of discs 56 mounted on a common shaft but insulated from each other, one set of alternating discs being connected to one side of the source of potential and the remaining discs being connected to the other side of the source so that adjacent discs are at opposite potentials, thereby setting up relatively intense cross currents in the soil between the discs.

As shown in Fig. 8, each disc 56 comprises a rim section 57 having a sharp cutting edge 58, which is insulatingly secured to a hub 59 by a pair of rings 60 of insulating materials which clamp over the inner edge of the rim section 57 and over a flange 61 on the hub 59, the rings 60 being clamped firmly in position by rivets 62 extending through the rings 60 and the flanges 61 and through the rings 60 and the rim portion 57 of the disc, respectively. The hubs 59 are freely rotatable on a shaft 63, which is supported at its outer ends on arms 64, which in turn are connected by arms 65 formed integrally therewith to the truck carrying the source of electrical energy. The arms 65 are preferably pivotally supported at their forward ends from a cross bar on the truck so that the disc assembly can rise and fall as it moves over uneven ground.

Electrical connection is made to the discs 57 through brushes 66 and 67, respectively, the brushes 66 contacting with one set of alternating discs 57 and the brushes 67 contacting with the other set of discs. All of the brushes 66 are attached to a shaft 66', which is insulatingly supported at its outer ends within bushings 68 of insulating material mounted in the upper ends of the arms 64, and all of the brushes 67 are rigidly mounted on a shaft 69 which is spaced from the shaft 65 and is insulatingly supported in insulating bushings 70 at each end, which bushings are supported within the upper ends of the arms 64.

Connection to the two sets of brushes is simply made by connecting the cables leading from the source of energy to the shafts 66' and 69, respectively. By applying sufficient potential to the alternate discs 57, currents may be set up between each pair of adjacent discs through the soil therebetween of sufficient intensity to destroy practically all forms of animal or plant life that may exist in the soil, thereby effectively sterilizing it.

Where it is desired to sterilize soil in green houses and the like, in which it would be inconvenient or impossible to run a machine of the type illustrated in Fig. 8 over the soil, electrical sterilization may be obtained with apparatus of the type shown in Fig. 5, in which a funnel shaped hopper 75 is provided in its lower portion with a plurality of metal partition walls 76, between which walls a series of electrodes 77 are positioned. These walls 77 may be suitably supported from insulating bars 78 so that they are insulated from the hopper 75 and the partition walls 76. By applying a suitable potential, as by leads 79, between the electrode 77 of the hopper 75 and the partition walls 76 connected thereto and shoveling the soil to be sterilized into the hopper, the soil may be electrically treated as it flows down between the electrodes 77 and the plates 76.

Although the weed killing machine as described and disclosed in Figs. 1, 2, 3, 6 and 7, has been described for use particularly in fields infested with obnoxious weeds, it is to be understood that its use is to be in no sense limited to this use. It is particularly effective in destroying weeds along the margins of highways and the like where the soil is usually so dry and hard as to make cultivation extremely difficult. My machine is ideal for use under such conditions because it kills weeds most efficiently when the surface soil is hard and dry, such condition resulting in practically all of the current from the electrodes passing down through the roots of the weeds to the relatively moist sub soil.

By applying relatively heavy currents to soil with the electrode structures described, the soil may be heated sufficiently by the current passing therethrough to produce sterilizing and fertilizing effects, supplementing those produced directly by the electric current. Thus it is now known that soil may be heated by steam to kill weed seeds, fungi, bacteria and other forms of animal and plant life therein, and it has been found that the heat also releases fertilizing elements in the soil so that plant growth is enhanced following the treatment. By sufficiently increasing the current applied to the soil with my apparatus, the soil can be heated to any necessary extent much more economically than with steam because the heat is generated in the soil itself and it is generated so rapidly that there is little loss by radiation and conduction during the actual heating period.

I have also found that when applying relatively high potentials to the electrodes, there is a great deal of arcing between the electrodes and the soil and within the soil itself as the latter is shifted and agitated by the electrodes. This arcing is beneficial because it fixes a part of the nitrogen in the air permeating the soil, making it available as fertilizer, and it also converts appreciable amounts of oxygen in the air into ozone, which is a powerful oxidizing agent and reacts with organic matter in the soil to further increase the amount of nitrogen available for plant life.

In some instances it may be impracticable to generate sufficient electrical energy to simultaneously energize all of the electrode elements to the extent necessary to produce the best results. In such instances it is advantageous to successively apply the entire output of the generator to different ones of the electrode elements, thereby producing intense electrification and heating in the soil adjacent each electrode during recurring intervals. A manner in which this may be accomplished is illustrated in the schematic diagram of Fig. 9.

In Fig. 9 an electric source 80, which may correspond to the generator 9, transformer 13 and other auxiliary circuit elements shown in Fig. 3, has one terminal connected by a lead 81 to a brush 82 bearing on a metal shaft 83 upon which a plurality of soil-contacting disc elements are mounted. Alternate disc elements 84 are electrically connected to the shaft 83 and are therefore permanently connected to one side of the source 80. The discs 85, 86, 87 and 88, intermediate successive pairs of the discs 84, are rotatably mounted upon the shaft 83 with insulating bushings 89. The actual construction of these discs may follow that shown in Fig. 8. The other side of the source 80 is connected by a conductor 90 to a brush 91 of a distributor 92 having a plurality of segments 93, 94, 95 and 96, respectively. The brush 91 may be mounted on a shaft 97 adapted to be continually rotated by a motor 98. The segments 93, 94, 95 and 96 are connected to discs 85, 86, 87 and 88, respectively.

It will be observed that in response to rotation of the shaft 97 the brush 91 will successively contact with the different segments 93, 94, 95, and 96 and will apply current successively between the discs 84, and each of the discs 85, 86, 87 and 88, the duration of application of current to each of the insulated discs depending upon the speed of rotation of the brush 91.

It is to be understood, of course, that the shaft 83, supporting the discs, is to be suspended from a truck containing the source of current 80 so that it can be moved over a field, the soil of which is to be treated. The discs 84 to 88, inclusive, are preferably of sufficient diameter to contact the soil over a substantial length in the direction of movement of the truck, and the distributor 92 driven at such a speed as to apply an impulse to each disc at least once while that disc is traveling a distance equal to its contact span with the soil, so that every portion of the soil with which the disc comes in contact will be electrically treated.

Obviously the scheme shown in Fig. 9 may be employed with electrode structures of the type disclosed in Figs. 1, 2, 3, and 4, as well as to disc electrodes. Thus if the method were applied to the electrodes shown in Figs. 1 and 2, one side of the source of current would be connected to all of the chains 7 of one electrode and the other side of the source would be successively connected to the different chains 8 of the other electrode by the distributor 92. In this instance, of course, the different chains 8 would be insulated from each other and from their supporting bar 4 by the insertion of a suitable insulating link in each chain.

The use of a distributor as described makes possible the application of extremely high current intensities to each electrode without employing a generating unit of prohibitive size, and it will be found, in many cases, that more effective results are obtained by applying an extremely heavy current intermittently to an electrode than by applying current of a less intensity continuously.

When the only object is to kill weeds, the apparatus described in Figs. 1 and 2 may be employed with a relatively small generator by employing a distributor to apply the entire output of the generator to the individual chains successively.

The power required for effective results varies according to the size and number of the electrodes. With the apparatus described 25 kilowatts per electrode for weed killing and 50 kilowatts for soil sterilization have proven satisfactory. The voltage may vary between 6,000 and 15,000. When alternating current is employed the exact frequency does not seem to be important as frequencies from 120 to 660 cycles per second have been employed with equally satisfactory results.

Obviously, many other variations and modifications than those described may be made in the apparatus without departing from the essential features of the invention, and the latter is to be limited only as set forth in the appended claims.

I claim:

1. Apparatus for treating soil areas comprising a motor driven truck and a driver's seat, means on said truck for producing an electric current, a pair of electrodes connected to said current producing means, means for supporting said electrodes in contact with the surface of the ground at spaced apart points with respect to each other, and an interlock switch in the circuit between said generator and said electrodes for completing said circuit only in response to occupation of the driver's seat of the truck.

2. Apparatus for electrically treating soil areas, comprising a motor driven truck having a cab with doors thereon, means on said truck for producing an electric current, a pair of electrodes connected to said current producing means, means for supporting said electrodes in contact with the surface of the ground at spaced apart points with respect to each other, and an interlock switch adapted to be closed only in response to closure of the door of said cab for completing the circuit from said source to said electrodes only when said cab door is closed.

3. Apparatus for treating soil areas comprising a vehicle adapted to be moved over the ground, means on said vehicle for producing a direct current, a pair of electrodes connected to said current producing means, means for supporting said electrodes in contact with the surface of the ground at spaced apart points with respect to each other, and a condenser bridged across said electrodes for storing current and supplying heavy surges of current to said electrodes in response to initial contact of said electrodes with weeds.

4. The method of killing weeds which comprises first applying high potential electric current thereto and thereafter immediately spraying them with a solution toxic to plant life.

5. Apparatus for treating soil areas comprising a vehicle adapted to be moved over the ground, means on said vehicle for producing an electric current, a pair of electrodes connected to said current producing means, means for supporting said electrodes in contact with the surface of the ground at spaced apart points with respect to each other, a tank on said vehicle for containing a spray solution toxic to plant life, and spray means mounted on said vehicle for directing a spray of said solution upon plants in the path of said electrodes after the electrodes have passed thereover.

6. Apparatus for treating soil in situ comprising a vehicle adapted to be moved over the soil, a plurality of soil-contacting electrodes, means for insulatingly supporting said electrodes from said vehicle in positions closely adjacent each other in a line extending transversely with respect to the path of movement of the vehicle, a source of electrical current on said vehicle, and distributor means for successively applying current from said source to each of said electrodes whereby the output of the source is intermittently applied to each electrode.

7. Apparatus as described in claim 6, in which each electrode contacts the soil for a substantial distance in the direction of movement of the vehicle, and in which the time elapsing between successive applications of current to each electrode is so short with reference to the speed of the vehicle that each electrode is energized at least once while moving through its soil-contacting length.

8. Apparatus for treating soil in situ, comprising a vehicle adapted to be moved over the soil, two sets of soil-contacting electrodes, means for insulatingly supporting the electrodes of each set from said vehicle in a line extending transversely with respect to the path of movement of the vehicle, the electrodes of one set being also insulated from each other, a source of electric current on said vehicle, and distributor means for successively applying the current from said source to each electrode of said one set and the electrodes of said other set, whereby the entire output of said source is successively concentrated in each electrode of said one set of electrodes and in the soil immediately adjacent each electrode of said one set.

9. Apparatus for treating soil in situ, comprising a vehicle adapted to be moved over the soil, a plurality of electrodes each comprising a knife element mounted in a line transverse to the direction of movement of the vehicle, each knife element being mounted to cut edgewise through the surface soil in response to movement of the vehicle, alternate knife elements being insulated from the intervening knife elements and from each other, and means for successively connecting said source across different pairs of successive knife elements, whereby the entire output of said source is intermittently concentrated in different sets of adjacent electrodes.

10. Apparatus for treating soil areas comprising a vehicle adapted to be moved over the area, means on said vehicle for producing an electric current, a pair of electrodes connected to said current producing means, and means for supporting said electrodes in contact with the surface of said infested area at spaced apart points with respect to each other, in which each of said electrodes comprises a plurality of articulated elements suspended in a line substantially transverse to the direction of movement of the vehicle, said elements being positioned close together in said line, whereby during movement of said vehicle they contact substantially all portions of the surface in a path the width of said line.

11. Apparatus for treating soil areas comprising a vehicle adapted to be moved over the area, means on said vehicle for producing an electric current, a pair of electrodes connected to said current producing means, and means for supporting said electrodes in contact with the surface of said infested area at spaced apart points with respect to each other, in which each of said electrodes comprises a plurality of articulated elements suspended in a line substantially transverse to a direction of movement of the vehicle, said elements being positioned close together in said line, said two electrodes being positioned in tandem relation whereby they successively traverse the same ground area.

12. Apparatus for treating soil areas comprising a vehicle adapted to be moved over the area, means on said vehicle for producing an electric current, a pair of electrodes connected to said current producing means, and means for supporting said electrodes in contact with the surface of said infested area at spaced apart points with respect to each other, in which each electrode has a ground contacting surface of substantial length in the direction of travel of the vehicle whereby contact between each electrode and the portion of the infested surface within its path is maintained for an appreciable interval of time.

13. Apparatus for treating soil areas comprising a vehicle adapted to be moved over the area, means on said vehicle for producing an electric current, a pair of electrodes connected to said current producing means, and means for supporting said electrodes in contact with the surface of said infested area at spaced apart points with respect to each other, in which each of said electrodes comprises a plurality of articulated elements suspended in a line substantially transverse to the direction of movement of the vehicle and in which the articulated elements comprise suspended flexible electrical conductors of such length as to drag upon the ground as the vehicle moves.

14. Apparatus for treating soil areas comprising a vehicle adapted to be moved over the ground, means on said vehicle for producing an electric current, and two sets of electrodes connected respectively to the opposite terminals of said current producing means, each electrode comprising a thin knife element mounted to cut edgewise through the surface soil in response to movement of the vehicle, and all of the knife elements being mounted in a line transverse to the direction of movement of the vehicle, the knives of one set alternating with the knives of the other set, whereby successive knives in said line are oppositely charged and set up transverse currents in the soil between each pair of adjacent knives, in which each of said knife elements comprises a thin ring element at least in part of metal in the shape of the rim of a disc, a metallic hub section, means for insulatingly connecting said rim section to said hub, a metal shaft for rotatably supporting said hubs, means for supporting said shaft from said vehicle, a set of brushes one brush contacting with each ring element, means for insulatingly supporting each set of brushes contacting with alternating ring elements with respect to the set of brushes contacting the remaining ring elements, and means for applying different potentials to said two sets of brushes.

15. Apparatus for treating soil areas comprising a vehicle and an operator's seat thereon, means on said vehicle for producing an electric current, a pair of electrodes connected to said current producing means, means for supporting said electrodes in contact with the ground at spaced apart points with respect to each other, and an interlock switch for applying current to said electrodes only in response to occupation of said operator's seat.

16. Apparatus for electrically treating soil areas comprising a vehicle and an operator's cab thereon, means on said vehicle for producing an electric current, a pair of electrodes connected to said current producing means, means for supporting said electrodes in contact with the ground at spaced apart points with respect to each other and an interlock switch for applying current to said electrodes only in response to closure of the door of said cab.

17. The method of treating soil which comprises applying high potential electric current thereto and approximately at the same time spraying the soil with a solution toxic to life.

18. Apparatus for treating soil in situ comprising a vehicle adapted to be moved over the ground, means on said vehicle for producing an electric current, a pair of electrodes connected to said current producing means, means for supporting said electrodes in contact with the ground at spaced apart points with respect to each other, a tank on said vehicle for containing a spray solution toxic to life, and spray means mounted on said vehicle for directing spray of said solution upon the ground in the path of said electrodes.

19. Apparatus for treating soil comprising a plurality of soil contacting electrodes, means for insulatingly supporting said electrodes in positions closely adjacent each other, a source of electrical current and distributor means for successively applying current from said source to each of said electrodes whereby the output of the source is intermittently applied to each electrode.

20. Apparatus for treating soil in situ comprising a vehicle adapted to be moved over the soil, two sets of soil contacting electrodes, means for insulatingly supporting the electrodes of each set from said vehicle in a line extending transversely with respect to the path of movement of the vehicle, the electrodes of one set being also insulated from each other, a source of electric current on said vehicle, and distributor means for successively applying current from said source to different electrodes of said one set and the electrodes of said other set whereby current from said source is successively concentrated in different electrodes of said one set of electrodes and in the soil immediately adjacent thereto.

FRED W. OPP.